United States Patent [19]
Wiklund

[11] 3,914,052
[45] Oct. 21, 1975

[54] APPARATUS FOR USE IN EQUIPMENT WHICH MEASURES PHYSICAL QUANTITIES BY SENSING PHASED DELAYS IN ELECTROMAGNETIC RADIATION

[75] Inventor: Klas Rudolf Wiklund, Taby, Sweden
[73] Assignee: AGA Aktiebolag, Lidingo, Sweden
[22] Filed: Nov. 14, 1973
[21] Appl. No.: 415,797

[30] Foreign Application Priority Data
Nov. 15, 1972 Sweden .................. 14798/72

[52] U.S. Cl. ............ 356/5; 343/12; 343/14; 343/17.5
[51] Int. Cl.² .... G01C 3/08; G01S 9/04; G01S 9/23
[58] Field of Search ....... 356/5, 4; 343/12, 14, 17.5

[56] References Cited
UNITED STATES PATENTS
2,528,109  10/1950  Blitz ........................ 343/14
3,542,472  11/1970  Vaniz ........................ 356/4
3,680,964  8/1972   Granqvist .................... 356/5

*Primary Examiner*—Maynard R. Wilbur
*Assistant Examiner*—S. C. Buczinski
*Attorney, Agent, or Firm*—Lerner, David, Littenberg & Samuel

[57] ABSTRACT

A device is disclosed in which a portion of a beam of light transmitted along a path to measure the same is diverted by a beam splitting apparatus for low frequency modulation and use in detection of the original beam when it reaches the end of the path. Two embodiments of low frequency optical modulators are disclosed, each of which employ a rotating optical disk together with light pipes of varying length.

2 Claims, 3 Drawing Figures

APPARATUS FOR USE IN EQUIPMENT WHICH MEASURES PHYSICAL QUANTITIES BY SENSING PHASED DELAYS IN ELECTROMAGNETIC RADIATION

FIELD OF THE INVENTION

This invention relates to optical measuring devices and particularly to optical measuring devices employing phase detection.

BACKGROUND OF THE INVENTION

One common type of distance measuring equipment now being employed includes a source of modulated light. The modulated light is transmitted along a path to be measured onto a target and then is reflected back towards the source. The reflected light is demodulated in a receiver and the phase of the demodulated signal is there compared with the phase of the modulating signal to determine the distance the modulated light beam has traveled.

Since the phase comparison between these two signals indicates the distance to be measured any phase errors in the system will translate directly into measuring errors. Two sources of such measuring errors are the modulator in the transmitter and the demodulator in the receiver.

Two ways have been developed to cope with phase errors in the modulator and demodulator. The first way is quite expensive since it entails constructing the modulator and demodulator equipment out of expensive circuitry to minimize these errors. Notwithstanding this, a mirror is needed to align the equipment to eliminate errors.

The second approach to overcoming the phase error problems introduced by the modulator and demodulator includes repeated calibration of the equipment with mirrors which are temporarily introduced for calibration purposes.

BRIEF DESCRIPTION OF THE INVENTION

In order to overcome these problems, the present invention contemplates a measuring apparatus in which an electromagnetic wave being mdoulated at a predetermined frequency and having a predetermined phase, is transmitted along a measuring path to be returned as a reflected wave onto a receiver therein in which there is included equipment for diverting a portion of the electromagnetic wave along a reference path to provide a reference wave; equipment intersects the reference path for phase modulating the reference wave at a frequency low compared to the predetermined frequency thereby providing a phase modulated wave; the reflected wave and phase modulated wave are combined and fed to a detector which drives indicating circuitry for indicating the length of the measuring path.

The indicating circuitry is also responsive to a signal from the phase modulating equipment for determing the length of the measuring path.

In the preferred embodiment of this invention the phase modulating equipment includes a disk having at least two fields thereon which have different effects upon the measuring wave and first, second and third reference wave guiding devices are employed for guiding portions of the reference wave along the reference path to interact with different portions of the disk. The first, second and third reference wave guiding devices are of different length.

The edge of the disk has markings thereon to provide a signal to the indicating circuitry.

DESCRIPTION OF THE DRAWINGS

For a more complete understanding of the invention, reference should be made to the following detailed description and drawings in which.

DETAILED DESCRIPTION OF INVENTION

Figure 1:
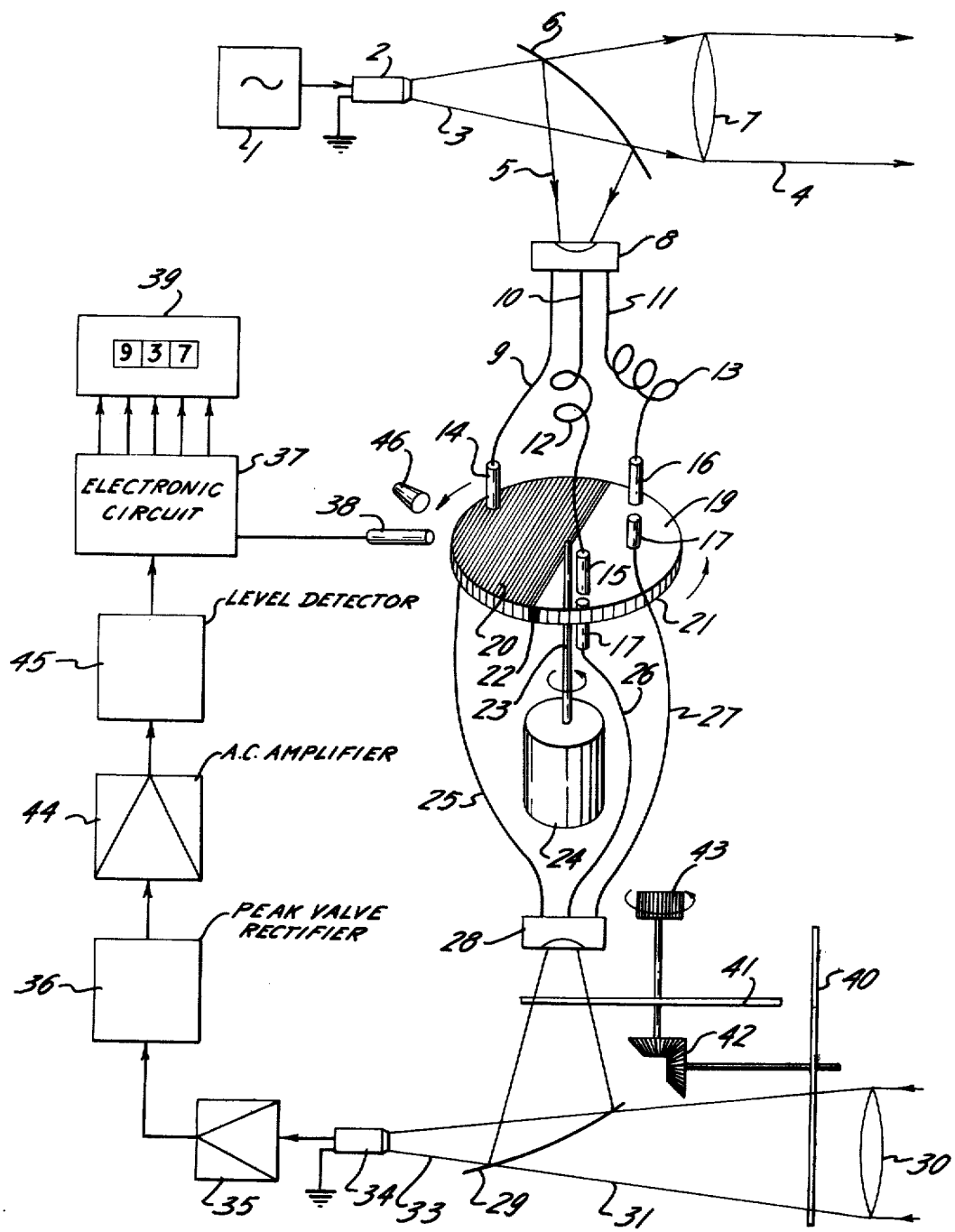
FIG. 1 is a schematic drawing showing a device embodying the principles of this invention.

In FIG. 1 a high-frequency precision oscillator 1, directly modulates a light-emitting diode 2, which thus emits an electromagnetic wave having a predetermined frequency and phase. This wave may consist for example of visible, ultraviolet or infrared light. In the present embodiment, visible light is employed.

The wave 3 is divided into two portions in a beam divider 6; a measuring portion 4 and a reference portion 5. The beam divider 6 may consist for example of known special prisms which are used so as to divide a beam path into two different beam paths, or of an ordinary lens or a plate glass, the beam 5 originating by reflection in the lens or the plate glass.

The measuring portion of the radiation passes a lens 7 and widens out over the distance which is to be measured, at the other end of which is placed a reflector (not shown).

The reference portion of the wave 3 passes an electromechanical reference modulator including elements 8 – 28 in which a low frequency is employed to modify the modulation frequency of the reference portion of the radiation. This resulting modified radiation 32, is mixed by means of a device 29 with the reflected radiation 31, returned from the reflector and falling through a lens 30, to give a radiation 33 which is detected by a light detector 34. The device 29 may be of a similar type as the device 6 which was described earlier.

An amplifier 35 passes the mixed, detected radiation to a peak value rectifier 36 with a time constant which is large in relation to the high-frequency signal. The output of the peak value rectifier 36 is passed by an a.c. amplifier 44 to a level detector 45.

The electromechanical reference modulator consists of a holder 8 for the light conductors 9, 10 and 11. By means of these three light conductors the reference radiation is passed to a rotating disk 18 which is provided with a transparent field 19 and an opaque field 20. The first light conductor 9 transmits the radiation directly to a position determined by holder 14. The second light conductor 10 includes a delaying length 12 corresponding to a phase displacement of 120° in relation to the radiation transmitted by means of the first light conductor 9 at the high frequency. The light conductor 10 ends in a holder 15, located just above the disk 18, but placed so that it is displaced by 120° with respect to the first light conductor. The third light conductor 11 includes a delaying length corresponding to a phase displacement of 240° and ends in a holder 16 which is located so that it is displaced by a further 120° from the second light conductor. Across the disk 18 from the holders 14, 15, 16 are located the holders 17, placed below the disk 18. Light conductors 25, 26, 27, which are of equal length, continue from the holders 17 to a holder 28, where the radiation in the three light conductors 25, 26 and 27 is mixed and passed on as the resulting modified radiation 32.

In the preferred embodiment, the disk 18 is divided along a diameter into the transparent field 19 and the opaque field 20 respectively. The disk is made to rotate by means of a motor 24 via an axle 23. The light which passes the disk is modulated with a low frequency, which coincides with the frequency of rotation of the disk.

To be able to analyze the mixed reference and measuring radiation and thereby obtain the measurement desired, information must be provided to the detector circuitry on the rate of rotation of the disk, and a reference point on the disk is needed. To do this lines 21 are provided on the edge of the disk 18 which are illuminated by a lamp 46 and are read by a detector 38, whose signal is transmitted to the electronic circuit 37. To obtain a point of reference on the disk 18, the latter is provided with a thicker line 22 which thus gives rise to an irregularity in the signal coming from the detector 38.

The electronic circuit 37 is thus fed with three different signals. One that indicates when the point of reference on the rotating disk in the reference modulator has a certain position, one which indicates the rate of rotation of that disk, and one which indicates when the radiation that is a mixture of the received radiation plus the modulated reference radiation passes through zero.

The signal from the detector 38 is employed to step a counter present in the electronic circuit in accordance with the phase position of the disk 18. A whole turn of the disk 18 corresponds to for example 5000 pulses. As the disk turns, the phase of the radiation 32 is modified so that the phase of the recorded signal can be compared thereto as a function of the angular position of the disk 18. The reference signal from the mark 22 on disk 18 causes the counter to be set to zero, giving a reference for the circuitry to have for the angular position of the disk. When a pulse comes from the level detector 45 the outputs of the counter are stopped, a display 39 connected to the outputs of the counter digitally show this value until the information in the counter is updated by the next pulse from the level detector 45.

In the method described, the sought distance is shown digitally, but devices known per se can certainly be connected to the instrument so that the distance may be recorded on, for example, a punched tape.

In order to allow the mixed radiation to be detected in the optimum manner in the receiver it is appropriate that the two portions of the radiation prior to mixing should have approximately the same intensity level. This may be accomplished in various ways and in FIG. 1 is shown one example of how this can be solved. Here a filter disk 41 is arranged in the path of the reference radiation and a filter disk 40 in the path of the measuring radiation. These filter disks 40 and 41 are made so that they have different permeability on different parts of their surface. A rotation of the disk will then cause a variation in the intensity of the transmitter radiation. The two disks are coupled together by a drive 42, so that when a knob 43 is twisted both disks will be rotated, whilst these disks are oriented so that when the intensity of one beam is reduced the other one is increased. This filter with two disks has the effect that a small deflection on the knob gives a large variation in the intensity ratio of the two radiations. Another manner of arranging the filter consists in allowing one single filter disk to be passed by the path of both beams, with the center of the disk, for example, being located in the middle between the beams, whereby a rotation of the disc produces the same thing as the filter device described. Naturally, only one disk placed in the path of one radiation may be used.

Figure 2:
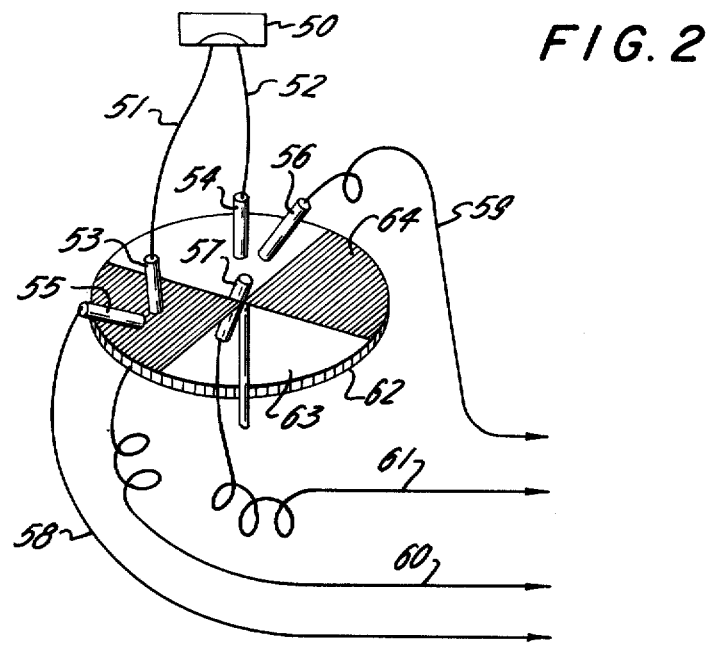
FIG. 2 is a schematic drawing showing a second embodiment of an electromechanical phase modulator shown in FIG. 1

The rotating disk in FIG. 1 can of course be divided into an arbitrary number of fields, which is shown by the example in FIG. 2, where the disk is divided into four fields, two opposite ones being transparent and the other two being opaque. In this figure another phase division has been achieved. The disk is designated 62 and an opaque field is designated 64 and a transparent field 63. In this embodiment of the electro-mechanical reference modulator the light conductor system has also been altered with regard to the previous figure so that from the holder 50, which picks up the reference radiation, two light conductors 51 and 52 originate with each end in their respective holder 53 and 54 situated just above the rotating disk. As in the reference modulator described earlier, the holders 57 are located below the disk in a position to receive light from the holders 53 and 54, respectively, The opaque field 64 has here been made reflecting, so that the light which strikes upon these opaque fields is reflected upwards and is captured by the holders 55 and 56, respectively, with the connected light conductors 58 and 59, respectively.

The light conductors 51 and 52 are equally long, but the light conductors 58 - 61 have different lengths so that the light conductor 59 is so much longer than conducctor 58 that a phase displacement of the radiation by 90° is obtained. The light conductor 60 is again so much longer that a further phase displacement by 90° is achieved in respect of the light conductor 59. The light conductor 61 finally is so long that a phase displacement by 270° is obtained in relation to the shortest light conductor 58. The four light conductors 58 - 61 consequently form a four-phase system (0°, 90°, 180°, 270°). The two conductors 51 and 52 which supply the radiation to the disk are placed with a mutual displacement of 90°. For the rest, this modulator operates in the same manner as that in FIG. 1.

Other combinations of the electro-mechanical modulator are also possible with an arbitrary number of light conductors. The light conductors can be placed just anywhere above the disk, provided the delays in the light conductors are in relation to the placings.

In order to achieve greater accuracy the signal paths for the reference radiation can be corrected individually both with regard to phase position and to strength of signal. The phase position can be altered for example in that the light conductors belonging to one phase above and below the disk are moved tangentially in relation to the disk. By mutual displacement of the said light conductors in relation to one another an amplitude correction is achieved.

Another method consists in having a grey scale inserted in the transparent field increasing or decreasing in radial direction. The amplitude correction can then be achieved by radially moving both light conductors belonging to one phase without mutual displacement.

In the lay-out shown in FIG. 2 the reflecting field will then also have such a grey scale.

For a further increase of the accuracy it is possible to provide between the opaque and the transparent fields a portion with gradually increasing transparency. An interpolation can then be made in the analyzing elements in order to achieve greater accuracy of the quantities sought.

A spread-out light conductor can also be used in that a light conductor (light conductor bundle) is allowed with its one end face to form a ring above the disk and that the other end of this spread-out light conductor is cut off obliquely so that the length of the light conductors diminishes linearly.

To prevent reflexes in the light conductors their end surfaces must be given antireflex treatment.

The beam divider 6 shown in FIG. 1 can in another embodiment be discarded, when, instead, the holder 8 for the light conductors is placed for direct radiation from the light emitting diode 2. Furthermore, it would be conceivable that in the transmitter and/or the receiver measuring portions of the radiation and reference portions of the radiation respectively are emitted by each transmitter and detected by each detector respectively. By such a method, however, the phase displacements of the transmitter and of the receiver respectively are not eliminated, since the different portions of the radiation originate from different light-emitting diodes and strike different detectors respectively.

It is not altogether necessary for the motor which drives the rotating disk to have absolutely constant speed since the speed is monitored the whole time by a special detector. However, it may be an advantage if the signal from this detector is permitted to control the motor which rotates the disk.

It has already been mentioned that the number of light conductors can be varied but that the function of the device requires at least three phases.

It is an advantage of the device in accordance with the invention that the same beam path is used for the measuring beam and the reference beam. This is especially important when a light beam from a light emitting diode is used, since the modulation phase in case of direct modulation of the light emitting diodes depends on the place of the emission on the radiating surface of the diode.

For the further limitation of such an effect by the light emitting diode, the start of the light conductor can be made mixed by mixing-in of the different part conductors over the whole receiving system in the light conductor holder.

In another embodiment the electro-mechanical reference modulator which has been described in connection with FIG. 1 and 2 can be substituted by an electro-optical modulator. This can consist for example of a number of KDP-crystals or liquid crystals. To this modulator a three-phase low-frequency modulation voltage is supplied. This type of modulator has no movable components.

The method and the device in accordance with the invention have been described in connection with a drawing where a light emitting diode is used as a source of radiation. Naturally, other light sources may also be used, for example lasers and incandescent lamps and also other sources of radiation for the obtaining of infrared or ultraviolet radiation. In the case of ultraviolet or infrared radiation being used together with an electro-mechanical reference modulator, the disk must be of a different type than that explained previously, inasmuch as it has to be arranged so that it transmits or prevents transmission respectively in different fields of the relevant radiation. It may here also be mentioned that the method according to the invention can in all probability also be used for microwaves.

The electro-mechanical modulator can also be realized so that the whole reference radiation is permitted to strike directly without light conductor upon a rotating disk, and that light conductors on the underside of the disk take charge of the radiation, these light conductors having built-in delays.

Figure 3:
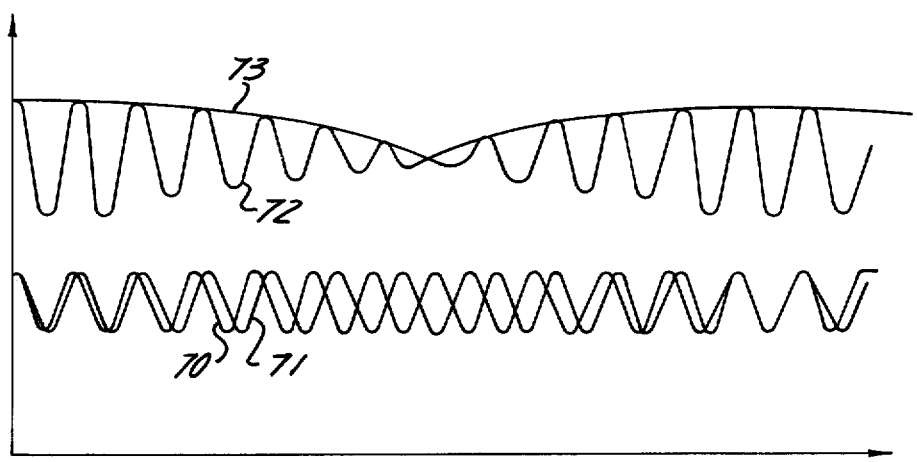
FIG. 3 is a graphic representation of the radiation at different points in the device of FIG. 1.

Finally, the method in accordance with the invention will be dealt with theoretically very briefly in conjunction with FIG. 3. The vertical axis in the figure indicates strength or amplitude of a signal, whilst the horizontal axis is a time axis.

The curve designated by 70 in the figure shows as an example the reference portion of the radiation after the same has been treated in the reference modulator, that is to say it constitutes the radiation emitted with an added low frequency. The emitted reflected radiation, before it is mixed with the reference radiation, is designated 71. The curve 73 is the signal to which the signal according to curve 72 is converted before it is fed to the electronic circuit 37 in FIG. 1.

The radiation emitted from the transmitter is designated $A + B \sin\omega_1 t$. The radiation returned from the reflector has then the equation $E + F \sin(107_1 t + \phi)$. If the rotation of the transparent and opaque fields of the disk in the reference modulator is $\omega_2$, the radiation which has passed this modulator can be designated $(A + B \sin\omega_1 t)(C + D \sin\omega_2 t)$. As mentioned just now, the reflected radiation and the radiation coming from the reference modulator are mixed and are detected and will form a signal according to curve 72 in FIG. 3. The envelope of this curve is designated 73 in FIG. 3. The signal according to the curve is then used in conjunction with information on the rate of rotation of the disk and on the position of its reference point in order to determine the time delay between emitted and reflected signal as a measure of the quantity sought.

This quantity sought may be for example the distance to the reflector, or that the radiation is permited to pass through a transparent medium to the reflector, when it is desired to determine the density of this medium. Furthermore, this time delay may also be used in order to produce an angle, in that the angular rotation is allowed mechanically to act upon the reflector to be shifted nearer to or farther away from the transmitter, the distance between transmitter and reflector thus being a measure of the angle sought.

What is claimed is:

1. In a measuring apparatus in which an electromagnetic wave being modulated at a predetermined frequency and having a predetermined phase is transmitted along a measuring path to be returned as a reflected wave onto a receiver therein, the combination including means for defining a reference path;

means for diverting a portion of said electromagnetic wave along said reference path to provide a reference wave;

means intersecting said reference path for phase modulating said reference wave at a frequency low compared to said predetermined frequency to provide a phase modulated wave;

means for combining said reflected wave with said phase modulated wave to provide a combined wave; and means responsive to said combined wave for indicating the length of said measuring path; said indicating means also being responsive to said phase modulating means;

said phase modulating means including:

a disk mounted for rotation and having at least two fields thereon having different effects upon said measuring wave; and first, second and third reference paths having guiding means for guiding portions of said reference wave along said reference path and each interacting with a different portion of said disk; said first, second and third reference paths having guiding means being of different length.

2. In the measuring apparatus as defined in claim 1 in which said disk has markings on an edge thereof; said combination also including;

means responsive to said markings for providing a low frequency phase signal to said indicating means.

* * * * *